United States Patent [19]

Laakso

[11] Patent Number: 5,009,278

[45] Date of Patent: Apr. 23, 1991

[54] METHOD AND A SUPPORT ARRANGEMENT IN A ROLLER VEHICLE TO BE STEERED BY A ROLLER MAT

[75] Inventor: Timo Laakso, Tuusula, Finland

[73] Assignee: 3TL Trading Co., Hyrylä, Finland

[21] Appl. No.: 466,422

[22] PCT Filed: Jul. 8, 1988

[86] PCT No.: PCT/FI88/00114

§ 371 Date: Mar. 26, 1990

§ 102(e) Date: Mar. 26, 1990

[87] PCT Pub. No.: WO89/01893

PCT Pub. Date: Mar. 9, 1989

[30] Foreign Application Priority Data

Sep. 2, 1987 [FI] Finland ............................ 873816

[51] Int. Cl.$^5$ .............................................. B62D 55/07
[52] U.S. Cl. .................................. 180/9.44; 180/9.46; 305/23
[58] Field of Search .................. 180/6.58, 6.6, 6.7, 180/9.25, 9.44, 9.46, 9.48, 9.54, 9.64; 305/16, 21, 23, 24

[56] References Cited

U.S. PATENT DOCUMENTS

| | | |
|---|---|---|
| 3,589,463 | 6/1971 | Stowers . |
| 3,938,607 | 2/1976 | Pohjola ............................ 180/9.44 |
| 3,973,638 | 8/1976 | Pohjola . |
| 4,936,639 | 6/1990 | Pohjola ............................ 180/9.44 |

FOREIGN PATENT DOCUMENTS

| | | |
|---|---|---|
| 48907 | 11/1975 | Finland . |
| 48908 | 11/1975 | Finland . |
| 51922 | 5/1977 | Finland . |
| 870397 | 1/1987 | Finland . |
| 819352 | 10/1937 | France . |

Primary Examiner—Charles A. Marmor
Assistant Examiner—Victor E. Johnson
Attorney, Agent, or Firm—McAulay Fisher Nissen Goldberg & Kiel

[57] ABSTRACT

A method and a support arrangement to steer a roller vehicle by a roller mat, which vehicle has an essentially rigid body part supporting the frame and the power engine with transmission means thereof to transmit power to a curved form turnable roller mat, whereby one side of the roller mat is shortened and the other side thereof is correspondingly lengthened. According to the invention, when the roller mat is being turned to a curved form the vehicle is tilted and its center of gravity is transferred to the side of the tilt in regard to the longitudinal axis of the vehicle. The support arrangement extends essentially the whole length of the body part, is suspended to the body part and comprises a separate, twistable, i.e. bendable or foldable, auxiliary body part supported to the support arrangement at two points on the center line of the vehicle, to which body the roller wheel assembly of the roller mat has been suspended nontransferably in regard to the auxiliary body, and which body is provided with means connected to the steering devices of the vehicle to twist the auxiliary body and thus to steer the vehicle.

16 Claims, 1 Drawing Sheet

METHOD AND A SUPPORT ARRANGEMENT IN A ROLLER VEHICLE TO BE STEERED BY A ROLLER MAT

BACKGROUND OF THE INVENTION

1. Field of the Invention

The invention relates to a method for steering a roller vehicle by a roller mat and a support arrangement in compliance with a roller vehicle to be steered by a roller mat.

More particularly, the invention relates to a method to steer a roller vehicle by a roller mat, in which the vehicle has an essentially rigid body part for supporting the frame and a power engine 2 with transmission means 3 to transmit power to the roller mat which is at least partially curved to form a turnable roller mat 4, such that one side of the roller mat is shortened and the other side thereof is correspondingly lengthened. The support arrangement to steer the vehicle to a curved form includes the turnable roller mat 4, and the rigid body part 1 supports the power engine 2 above and the transmission means 3 transmits a driving force directly to the outer periphery of the roller mat 4 adapted around a turnable roller wheel assembly 6, 7 under the body part 1.

In before-known roller-steered vehicles it has been used two individually driven roller mats, whereby by changing their rotational direction or speed the steering of the vehicle is accomplished. The weakness in this arrangement consists of, however, the need of two separate steering systems and the complexity and susceptibility to damages of the steering system caused by it.

To eliminate such disadvantages connected with the traditional steering system. There is known a steering system and device for its implementation according to the Finnish Patent No. 46708. By the principle presented in this patent the vehicle is provided only by one roller mat arranged around, the front and rear end roller assemblies, one of which is driven by a proper transmission gear of a power engine, and which are turned essentially equally by partial turns and minimum turning radius. In this case the roller mat is forced to a curved position effecting the turning. Especially concerning the directional stability this kind of a steering system is not, however, satisfactory. Particularly to improve the directional stability there is proposed in the Finnish Patent No. 51922 a better steering system and a device to realize it. The principle of this patent is mainly characterized in that the portion of the roller mat on the side of the vehicle's front end with its end roller assembly is turned by essentially greater turning radii than the minimum turning radius of the vehicle with a higher angular velocity than the rear portion of the roller mat with its roller assembly and simultaneously the rear end roller assembly and the rear end of the roller mat are forced to function automatically without any adjustable steering devices.

Both above-mentioned patents with respect to a curved position turnable roller mats have the disadvantage, that the roller mat does not remain over the turning rollers. A solution to this problem has therefore been attempted to be solved by making on the center line of the roller mat, to the inner periphery of the mat, a projection profiled as a dovetail, to the web of which are supported on both sides a pair of rollers connected to the steering levers to turn in a way corresponding to the turning of the end roller assembly in order to prevent that the roller mat, influenced by great lateral forces resisting the turning and applied by the base to the roller mat, would not slide off over the end roller assembly, which would, if happened, make the vehicle completely unfit for driving and steering. In practical test drives a disadvantage has anyhow been observed, that the projection formed as a dovetail cannot alone reliably prevent displacement of the roller mat, which disadvantage is yet emphasized in curve driving, when it is strived to tilt the vehicle to the side of the inner curve, and also in hill driving, when it is necessary to steer the vehicle obliquely because of for example a natural obstacle or steepness of the hill. The beforeknown vehicle provided with a roller mat turning as a curve should therefore be driven by a particular driving style, whereby one should always try to keep the vehicle, if possible, in constant position regarding the surface of the terrain, which can be done, when the driver transfers his own center of gravity to different locations in the vehicle without tilting the vehicle.

One purpose of the present invention is to eliminate the aforementioned disadvantages and weaknesses connected with the traditional roller mat steering, and on the other hand to provide a new method and device for steering of a roller device by a roller mat, so that the steering of the roller device would as accurately as possible resemble the steering principle of a motorcycle.

These purposes has been achieved by the method and arrangement mentioned in the introduction, the characteristic features of which have been presented in the enclosed claims.

SUMMARY OF THE INVENTION

According to the invention a device having an essentially rigid body part, which supports the frame and the power engine with transmission gear for power transmission to the roller mat turnable to a curve form to drive the vehicle, and to which device has been supported and suspended and essentially to its whole length extending bendable or jointably foldable support arrangement, a so-called auxiliary body carrying the roller mat, which supports the roller wheel assembly, is steered by tilting and thus by transfer of the center of gravity so, that the roller mat is displaced by bending the support arrangement from the direct driving position, in which each side of the roller mat is essentially at the same distance from the body part, to the curve driving position, in which one side of the roller mat is at least partially closer to the body part than the other side thereof, whereby at the same time as the support arrangement is being bended to displace the roller mat to the curve driving position, the roller mat itself becomes shorter, as is generally known, at its one side and longer at its other side and the body part gets tilted, so that the center of gravity of the vehicle transfers in regard to the longitudinal center line to the side of the tilt.

According to an advantageous embodiment of the invention the auxiliary body consists of rods made of spring steel, which have an inclination when displaced from their balance position to return to their balance position, so that the advantage of the automatical return of steering can be gained. This effect is enhanced by the fact, that the roller mat is prestressed, so that also it has an inclination to return to its balance position, i.e. direct driving position, whereby also the auxiliary body formed by rodlike elements, the parts of which body has been made foldable by ball joints, has an inclination to return to its balance position or ensure the automatic return of the steering.

One of the main advantages of the invention is, that the curve driving in terrain, as on roads, is easy and can mainly be compared with the motorcycle driving, and due to the tilting vehicle the driving is reliable and directionally stable even with great speeds and small turning radii. Because in curve driving or oblique hill driving, according to the most advantageous embodiment of the invention, only the edge zone of the roller mat can be held against the base, the lateral frictional force resisting the turning and applied by the base to the roller mat is continuously small, wherefore the roller mat even in sharp turns or oblique hill driving does not try to be displaced, so that with the steering roller vehicle according to the invention can, even with the load of several persons, also long uninhabited roadless journeys in the wilderness be reliably driven.

One advantage connected with the invention is still, that no forces are applied to the roller mat bending it forcibly to a curved form, but that by bending or folding the support arrangement, i.e. the auxiliary body, and due to the tilting of the vehicle because of it and the shortening of one side of the roller mat and lengthening of the other side thereof the roller mat is twisted and placed in a curved position, whereby the curve or hill drive by the tilting vehicle becomes possible.

BRIEF DESCRIPTION OF THE DRAWING

The invention will be decribed in detail in the following using some of its advantageous embodiments as examples with reference to the accompanying drawing, in which.

DESCRIPTION OF THE PREFERRED EMBODIMENT

Figure 1:
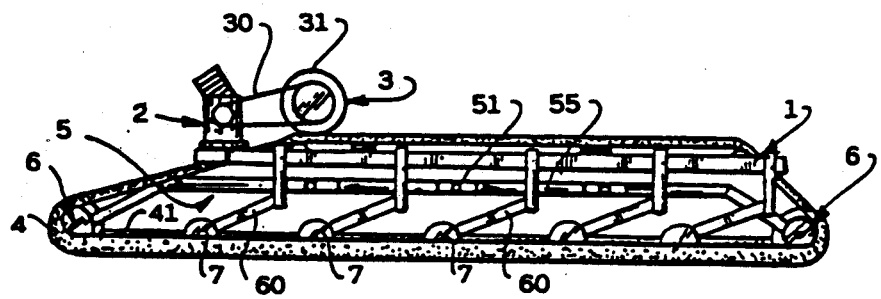
FIG. 1 shows a schematic side view of the roller vehicle.

The vehicle steered by the roller mat comprises:
- a rigid body part 1 supporting a power engine 2 above and the power transmission means 3 connected with it to transmit the driving force to the roller mat 4,
- a separate support arrangement 5, 5' suspended from the body part 1 and supported to it at two points on the center line of the vehicle, this support arrangement being twistable, i.e. bendable or jointably foldable, and called in the following as the auxiliary body, to which have been suspended the roller wheel assembly 6, 7 of the roller mat 4, and
- means 8, 9 connected to the steering equipment of the vehicle to bend the auxiliary body 5, 5' and thus to steer the vehicle.

The rigid body part 1 is preferably composed of two longitudinal main beams 10 and transversal frame beams 11 or a plate uniting them, which beams have advantageously been connected to each other by welding to form the mentioned rigid body part 1. The purpose of the body part 1 is to support above it the vehicle frame (not shown) and power engine 2, e.g. a combustion engine, power transmission means 3, e.g. a transmission belt 30, chain etc. and a toothed roller 31 to transmit the driving force to the outer periphery of the roller mat 4.

To transmit the power to the roller mat 4, its outer periphery is provided with a transverse configuration suitable for the toothing of the toothed roller 31. Advantageously this configuration can be realized so, that the roller mat consists of in regard to the longitudinal axis of the vehicle transverse small pipe pieces and narrow portions connecting these pipe pieces together, whereby the small pipe pieces yielding in the longitudinal direction of the vehicle make the stretching of the roller mat possible. It is further advantageous that in the roller mat has been formed a channel, to which has been fitted a continuous, prestressed and at several points in regard to the roller mat non-transferably locked steel wire, which together with the yielding property of the small pipe pieces achieves the shortening of the roller mat. Because the roller mat 4 is bendable to a curved form, it is advantageous, that the toothing of the toothed roller 31 consists of individual teeth, the working surface of which has been formed as a cycloid, so that between the configuration of the roller mat 4 and the toothing of the toothed roller 31 no transverse sliding movement takes place, which would chafe the roller mat 4, especially when the toothed roller 31 is located so, that it matches the support point in the body part of the auxiliary body 5, 5'.

To ensure that the roller mat between the body part 1 and the auxiliary body 5, 5' would extend symmetrically in regard to its longitudinal axis and straightly to the driving toothed roller 31, the body part 1 is provided with a slide guide 12 and flexibly supported impellers 13 supported to a center ridge 41, which is placed on the inner periphery of the roller mat 4 symmetrically to the longitudinal axis thereof.

Figure 2:
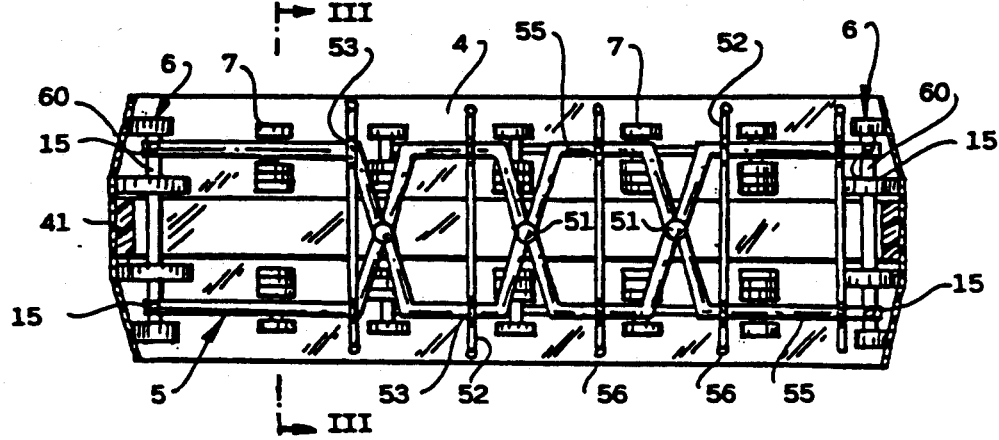
FIG. 2 shows the roller vehicle as in FIG. 1 provided with a support arrangement according to an advantageous embodiment of the invention as seen from above with the body part and upper part of the roller mat removed and without bending means for the support arrangement.

The auxiliary body 5 according to the the first advantageous embodiment of the invention and being best conceivable by FIG. 2 is composed of a jointed lattice 5 consisting of at least three, advantageously four, as in FIG. 2, or five frame parts made of rodlike elements, which parts to enable the twisting of the auxiliary body 5 have been coupled together on the longitudinal center line of the vehicle by ball joints 51, whereby the frame parts formed by rodlike elements 55, which to maximize the structural strength and at the same time the lightness thereof are made of spring steel pipes or billets, can freely turn to each direction around the joint point. As shown in FIG. 2, the elements 55 directed outwards from the ball joints 51 have been adapted to extend obliquely towards the vehicle sides, so that they leave between them a bending reserve enabling to bend the auxiliary body 5 to a folded position, which reserve depending on the selected number of the frame parts can be between 5° . . . 40°. As further indicated in FIG. 2, the auxiliary body 5 extends essentially to the whole length of the roller vehicle, and to one of its end parts has been mounted by bearing brackets 15 the front end roller wheels 6 and to the other end part the rear end roller wheels 6, around which wheels the roller mat is rotating. In order that the body part 1 and the auxiliary body 5 would maintain their mutual position, two of the ball joints 51 in the auxiliary body 5 have been supported non-transferably to the body part 1. To ensure the fixed position of the auxiliary body 5, the ball joints 51 connected to its end frame parts, i.e. the ball points nearest to the edge, can be supported to the transverse frame beams 11 of the body part 1.

Figure 3:
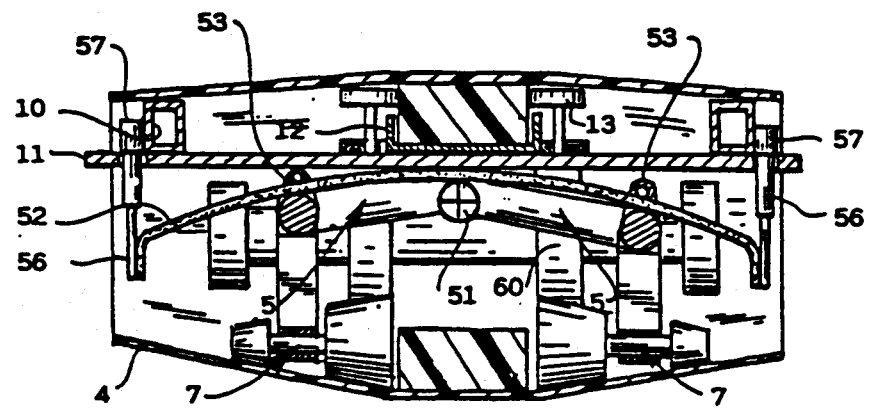
FIG. 3 shows an enlarged and more detailed sectional view taken along the line III . . . III of FIG. 2.

As shown in FIGS. 2 and 3, the auxiliary body 5 has been suspended to the body part 1 by several parallelly spaced support bars 52 transverse to the longitudinal axis of the vehicle, the ends of which are directed slantingly downwards from the body part 1. In the preferred embodiment of the invention each support bar has been made of spring steel and formed essentially as a circle segment, moreover to maintain the transverse position of the support bar 52 each bar 52 has been supported at three points to the body part 1. In the preferred embodiment the topmost, i.e. center part of the curve of the support bar 52 has been rigidly attached, f.ex. by a weld or bolt joint, to the transverse frame beam 11, and the ends thereof by properly dimensioned spacers 56 to the longitudinal main beams 10.

As is most clearly visible in FIGS. 1 and 3, the intermediate roller wheels 7 between the end roller wheels 6, supporting the portion of the roller mat 4 against the base between the front and rear end roller wheels 6, have been rigidly suspended, preferably by torsion arms 70, to the rodlike elements 55 of the auxiliary body 5. In this way the advantage is gained, that the intermediate roller wheels 7 can be effectively moved in vertical direction, whereby the roller wheels 6 support all the time the roller mat 4 regardless the unevenness of the base, and simultaneously a great torsional strength is attained against lateral bending.

As already stated before, the transverse support bars 52 have been formed as a circle segment. In this case it is advantageous, that the end of the support bar 52 is placed 2 ... 10 cm, preferably about 5 cm, lower than the middle part of the support bar 52. The auxiliary body 5 has been suspended to each support bar 52 by a thrust bearing 53, as shown in FIG. 3, so that when the auxiliary body is being twisted, it can move laterally on the support bearings 53 along the transverse support bar 52. Now the auxiliary body 5 is bent to a folded position and it tilts in regard to the vehicle body part 1 forcing thus the roller wheels on the other side of the roller mat 4 closer to the body part and the roller wheels on the opposite side correspondingly farther away from the body part, whereby the roller mat 4 is displaced from the direct driving position to the curve driving position, i.e. curved and an oblique position regarding the vehicle body part, at the same time when the center of gravity of the vehicle transfers to the side of the tilt, i.e. to the side in regard to the longitudinal axis of the vehicle, where the roller mat 4 is closer to the body part 1. The form of the support bars 52 determines thus the tilting grade and velocity of the vehicle. Regarding the mentioned tilting grade and velocity as well as driving comfort of the vehicle it is advantageous, that in addition to flexible support bars 52 the spacers 56 supporting their ends are made of spring means, f.ex. coil springs, or as in FIG. 3 of telescopically moving pressure springs. Further on it is advantageous especially in order to set the tilting grade or velocity, i.e. to change the curvature of the support bar 52, that the length and supporting of the spring means 56 in the longitudinal main beam 10 is adjustable. In the embodiment in FIG. 3 this has been achieved so, that the fastening of the other end of the telescope spring 56 acting as a spacer is settable, whereby a sleeve provided with inner threading serves as its supporting piece 57 in the mean beam 10. By turning the other half of the telescope spring in the sleeve, both the position of the spring means 56 in regard to the body part 1 and the curvature of the support bar 52 can be changed.

Figure 4:
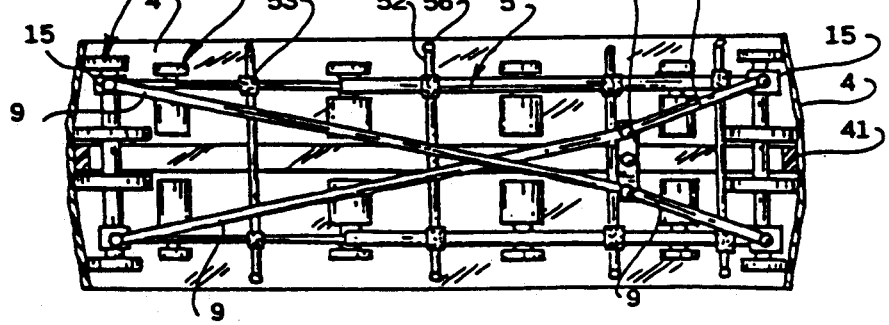
FIG. 4 shows the roller vehicle provided with a support arrangement and bending means thereof according to another advantageous embodiment of the invention with the body part and the upper part of the roller mat removed.

In FIG. 4 has been shown another advantageous embodiment to realize the twistable auxiliary body 5'. The auxiliary body 5' according to this other embodiment is as before supported at two points to the rigid body part 1 of the vehicle to maintain the mutual adaptation of the auxiliary body and the body part, and suspended by transverse downwards curving support bars 52 to the vehicle body part 1. The auxiliary body 5' supports as before by the bearing brackets 15 thereof both the front and rear end roller wheels 6 of the vehicle and advantageously by the torsion arms 60 flexibly suspended intermediate roller wheels 7.

As indicated in FIG. 4, the auxiliary body comprises instead of the jointed arrangement two elongate elements 5' extending essentially along the whole vehicle length and being formed to maximize the structural lightness and strength by pipes made of spring steel, so that these flexible pipes make the bending and twisting of the auxiliary body 5' possible.

According to a preferred embodiment of the invention the auxiliary body is twisted to enable the curve driving so, that the corners on the side of the inner curve of the auxiliary body are forced to transfer towards each other and the corners on the side of the outer curve are forced to transfer from each other, whereby the jointed auxiliary body 5 according to the first embodiment of the invention is folded and tilts, so that this tilting corresponds to the curvature of the transverse support rods, and whereby the auxiliary body 5' according to the second embodiment of the invention is twisted, so that this twisting corresponds to curvature of the transverse support bars.

In FIG. 4, there has been shown the means suitable for twisting of both the auxiliary body 5 according to the first embodiment of the invention and the auxiliary body 5' according to the second embodiment of the invention. As can be observed in FIG. 4, the auxiliary body 5, 5' includes:

- a torsional element 8 intended for connection to the handwheel by suitable intermediate rods (not shown), f.ex. a circular or flat plate, which is at the center point thereof mounted in bearings to the body part 1, preferably to the transverse frame beam 22, to turn to either direction around its mounting point, and
- four pieces of intermediate arms 9, each of which has been axled to the aforementioned torsional element 8 at a distance from its mounting point, and at the other end thereof to the auxiliary body 5, 5'. Axling of the other ends of the intermediate arms 9 can be in a most simple way be realized by utilizing bearing brackets 15 near the vehicle corners, intended for the suspension of axles 60 of the front and rear end roller wheels 6 of the vehicle, to which brackets can be mounted suitable vertical spindles for this purpose.

That, when the torsional element 8 is being turned, the auxiliary body 5, 5' would bend to the desired direction, or that the corners of the auxiliary body on the side of the inner curve would come closer to each other, it must be observed in the axling of the intermediate arms, that the ends of the intermediate arms 9 directed to one side of the vehicle and axled to the torsional element 8 are twisted to opposite directions in regard to the longitudinal line through the mounting point of the torsional element 8, when the torsional element 8 is being turned.

This can be carried out by for instance the arrangement according to FIG. 4, in which the intermediate arms 9 axled crosswise to the corners of the auxiliary body 5' have been axled to the same point in the torsional element 8. Alternatively can the intermediate arms, axled to the front corners of the support arrangement 5, 5', be axled to one point in the torsional element 8 and correspondingly the intermediate arms axled to the back corners of the support arrangement 5, 5' can be axled to another point in the torsional element 8.

It must be stated concerning the auxiliary body according to the second advantageous embodiment of the invention, that the elongate elements 5' are parallel and spaced from each other, so that when the auxiliary body 5' is being twisted a tensile stress is developed in one elongate element striving to stretch this element, and a compressive stress in the other element striving to bend this elongate element to a curved form. To compensate the tension caused by the tensile stress each elongate element 5' consists of telescopically within each other moving spring steel pipes, the total length of which is in its minimum when the support arrangement is not bent. Because the telescope pipe has the aforementioned minimum length, the telescope pipe on the side of the inner curve is turned to a curved form when the auxiliary body is being twisted because of the approaching of the mounting points thereof, which additionally generates a counterforce corresponding to the bend and striving to compensate the twisting, which force in this second advantageous embodiment of the invention makes the automatic steering operational again.

In a preferable embodiment of the invention the peripheral length of the roller mat 4 becomes smaller towards the edges thereof, whereby the edges of the roller mat are apart from the base in the direct driving position and only the middle part of the roller mat is supported to the base. In this embodiment the roller mat itself rotates centripetally around the roller assembly and does not strive to be displaced from above the roller wheel assembly 6, 7. As can be seen in FIG. 3, the roller wheels have been dimensioned and supported to support the roller mat form, which is laterally outward slanting. To ensure the stationary position of the roller mat, the height of the center ridge 41 extending between the roller wheels 6, 7 has been dimensioned to correspond at least half of the diameter of the innermost intermediate roller wheels 6, so that the roller wheels cannot inadvertently "climb" over the center ridge, which, if happened, could lead to the displacement of the roller mat.

The invention has been described above only by some of its advantageous embodiments. This does not, of course, have any restrictive nature for the invention and as it is clear to those skilled in the art, there are various modifications and alternative arrangements possible within the scope of appended claims. This concerns particularly the form and suspension of the transverse bar and also the structure and equipment of the auxiliary body itself, for example the use of pneumatics or hydraulics to twist and/or bend the auxiliary body and thus to tilt the roller mat and the vehicle body in regard to each other as well as to bend the roller mat to a curved form.

I claim:

1. A support arrangement in a roller vehicle for steering thereof, including:
   a turnover roller mat 4;
   a rigid body part 1 for supporting a power engine 2 and transmission means 3 for transmitting a driving force directly to an outer periphery of said roller mat 4 movable around a turnable wheel assembly 6, 7 under said rigid body part 1;
   a support arrangement 5 extending the whole length of said body part 1 and suspended therefrom, said support arrangement including a separate, twistable auxiliary body 5, 5' supported by said body part 1 at two points on a center line of said vehicle;
   said roller wheel assembly 6, 7 being suspended by said auxiliary body 5, 5';
   said auxiliary body being provided with means 8, 9 connected to steering means for said vehicle for twisting said auxiliary body 5, 5' for steering said vehicle;
   said auxiliary body including two flexible, telescopically lengthening rod means, the length of said rod means being at a minimum extent when said auxiliary body is in a unfolded balance state;
   said auxiliary body 5, 5' being connected to said body part 1 by several parallel and spaced downwardly directed support rods 52 transverse to a longitudinal axis of said vehicle passing through a center of gravity of said vehicle defining a longitudinal center line thereof, each of said rods being supported to maintain the transverse position thereof at three points to the body part 1;
   said auxiliary body 5, 5' being suspended to each support rod 52 by at least two thrust bearings 53, so that when said auxiliary body 5' is twisted it can move on said thrust bearings 53 along said transverse support rods 52, whereby on one side of said roller mat 4, the distance between said roller wheels 6, 7 and said body part 1 is shorter and on the other side of said roller mat 4 the distance between the roller wheels 6, 7 and the body part 1 becomes correspondingly longer, so that the roller mat 4 is displaced from a direct driving position to a curved driving position, at the same time when the center of gravity of the vehicle transfers from a side towards which said vehicle tilts on one side of the longitudinal center line of the vehicle to a side on the other side of the longitudinal center line of said vehicle, whereat said roller mat 4 is closer to said body part 1.

2. The support arrangement according to claim 1, wherein said auxiliary body 5 comprises:
   a jointed lattice 5 having at least three frame parts made of rod-like elements 55, said frame parts including ball joints 51 for coupling said frame parts together on the longitudinal center line of the vehicle, two of said ball joints being connected to frame parts nearest an edge of said vehicle; and
   elements directed outwardly form said ball joints 51 extending obliquely towards sides of said vehicle for providing between them a turning reserve enabling a folding of said auxiliary body 5.

3. The support arrangement as claimed in claim 1, wherein said transverse support rods 52 are formed as a circle segment, and said support rods have ends placed between 2 and 10 cm lower than a center part of said support rod 52, from which center part said support rod 52 has been supported directly and firmly to the body part 1, and spacers 56 coupled to the ends of said support rods 52 for supporting said body parts.

4. The support arrangement as claimed in claim 3, wherein said spacers 56 supporting the ends of said support rods 52 comprise spring means 56, and including means for increasing the length of each said spring means 56.

5. The support arrangement as claimed in claim 4, wherein a means 8, 9 to twist said auxiliary body 5, 5' comprises a torsional element 8, said torsional element including a circular plate mounted at a center point thereof in bearings to said body part 1 allowing turning movement in each direction around said center point, and at least four intermediate arms 9 each arm having two ends, each of said arms at one end thereof being axled to said torsional element 8 at a distance from said center point, and at the other end thereof mounted to said auxiliary body 5, 5' at corners thereof, said auxiliary body having at least four corners.

6. The support arrangement as claimed in claim 5, wherein said intermediate arms 9 have ends axled to said torsional element 8 and are twisted to opposite directions in regard to the longitudinal line going through the mounting point of the torsional element 8 when said torsional element 8 is being twisted.

7. The support arrangement as claimed in claim 6, wherein said roller mat 4 has a peripheral length which becomes smaller towards the edges thereof, said roller mat having a base and a center part, said edges of said roller mat 4 being in a direct driving position apart from said base and only said center part of said roller mat being supported to said base, and said roller wheels 6, 7 being dimensioned and suspended flexibly to said auxiliary body 5, 5' to support at least a part of said roller mat 4.

8. The support arrangement as claimed in claim 1, wherein said roller mat 4 has a peripheral length which decreases towards edges thereof, said roller mat having a base and a center part, said edges of said roller mat 4 being in a direct driving position apart from said base and only said center part of said roller mat being supported to said base, and said roller wheels 6, 7 being dimensioned and suspended flexibly to said auxiliary body 5, 5' to support at least a part of said roller mat 4.

9. The support arrangement as claimed in claim 2, wherein said transverse support rods 52 are formed as a circle segment, and said support rods have ends placed between 2 and 10 cm lower than the center part of said support rod 52, from which center part said support rod 52 has been supported directly and firmly to the body part 1, and spacers 56 coupled to the ends of said support rods 52 for supporting said body parts.

10. The support arrangement as claimed in claim 1, wherein a means 8, 9 to twist said auxiliary body 5, 5' comprises a torsional element 8, said torsional element including a flat plate mounted at a center point thereof in bearings to said body part 1 allowing turning movement in each direction around said center point, and at least four intermediate arms 9 each arm having two ends, each of said arms at one end thereof being axled to said torsional element 8 at a distance from said center point, and at the other end thereof mounted to said auxiliary body 5, 5' at corners thereof, said auxiliary body having at least four corners.

11. The support arrangement as claimed in claim 10, wherein said intermediate arms 9 have ends axled to said torsional element 8 and are twisted in opposite directions relative to a longitudinal line going through the mounting point of the torsional element 8 when said torsional element 8 is being twisted.

12. The support arrangement as claimed in claim 11, wherein said roller mat 4 has a peripheral length which becomes smaller towards edges thereof, said roller mat having a base and a center part, said edges of said roller mat 4 being in a direct driving position apart from said base and only said center part of said roller mat being supported to said base, and said roller wheels 6, 7 being dimensioned and suspended flexibly to said auxiliary body 5, 5' to support at least a part of said roller mat 4.

13. The support arrangement as claimed in claim 12, wherein said transverse support rods 52 are formed as a circle segment, and said support rods have ends placed between 2 and 10 cm lower than the center part of said support rod 52, from which center part said support rod 52 has been supported directly and firmly to the body part 1, and spacers 56 coupled to the ends of said support rods 52 for supporting said body parts.

14. The support arrangement as claimed in claim 1, wherein the support rods 52 have ends, further including spacers 56 supporting the ends of said support rods 52, said spacers comprising springs.

15. A method to steer a roller vehicle, said vehicle comprising:
   a turnover roller mat 4 having an outwardly curved center section and two spaced side sections, each side section having two corners;
   a rigid body part 1 for supporting a power engine 2 and transmission means 3 for transmitting a driving force directly to an outer periphery of said roller mat 4, said roller mat being movable around a turnable wheel assembly 6, 7 located under said rigid body part 1;
   a support arrangement extending the whole length of said body part 1 and being suspended therefrom, said support arrangement including a separate, twistable auxiliary body 5, 5' supported by said body part 1 at two points along the center line of said vehicle;
   said auxiliary body 5, 5' being connected to said body part 1 by a plurality of parallel spaced downwardly directed support rods 52 extending transversely to the longitudinal axis of said vehicle and passing through the center of gravity of said vehicle thus defining a longitudinal center line thereof, each of said rods being supported at three points to the body part 1 to maintain the transverse position thereof;
   the method including the steps of turning the roller mat 4 to a curved position,
   forming an inner curve on one side section and an outer curve on the other side section for moving the each corner of said roller mat 4 simultaneously on the side section of said inner curve towards each other and said body part 1, and moving the corners on the side section of the outer curve away from each other and away from the body part 1 so as to tilt the vehicle corresponding to the curvature of the transverse support rods 52, wherein the tilt is adjusted by changing the curvature of the transverse support rods.

16. The method of claim 15, wherein said roller mat has a parabolic curvature.

* * * * *